May 27, 1930. D. P. COOPER 1,760,632
SYSTEM AND METHOD OF UTILIZING TIDAL ENERGY
Filed Dec. 7, 1925 2 Sheets-Sheet 1
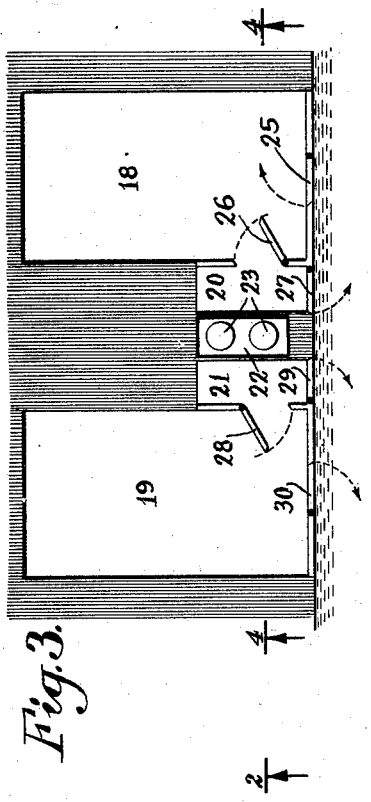
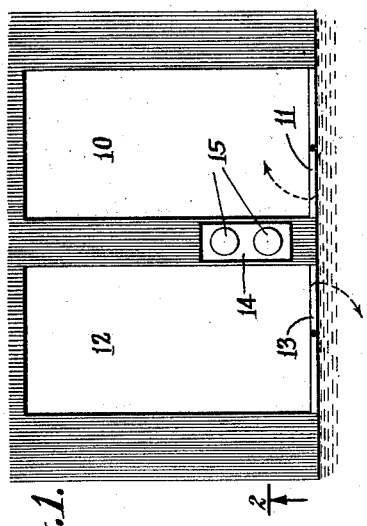
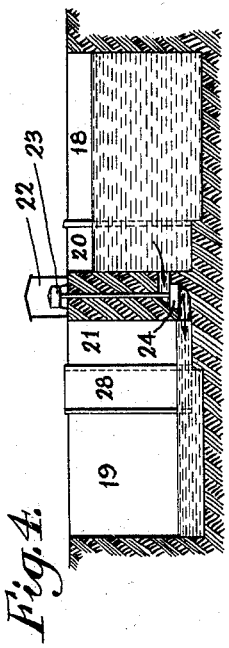
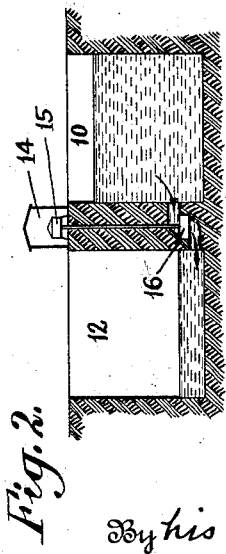
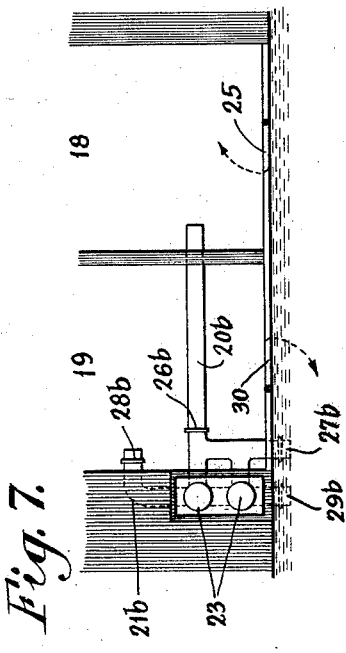
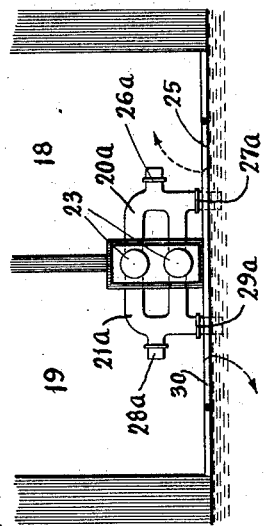
Inventor
D. P. Cooper
By his Attorneys
Cooper, Kerr & Dunham Patented May 27, 1930

1,760,632

UNITED STATES PATENT OFFICE

DEXTER P. COOPER, OF EASTPORT, MAINE

SYSTEM AND METHOD OF UTILIZING TIDAL ENERGY

Application filed December 7, 1925. Serial No. 73,595.

That the tides produced in the oceans by the gravitational attraction of the sun and moon possess enormous potential energy has long been known, and it is frequently suggested that means might be found for utilizing some part of such energy. The obvious method is to impound the tidal waters at high tide in reservoirs, natural or artificial, and then release the impounded water into the sea through turbines or the like when the tide has fallen far enough to afford an adequate head. This method has the objection that the generation of power is intermittent, and the still more serious objection that the period of power generation advances from day to day. Two reservoirs have therefore been suggested, one in which water may be impounded at high tide, and another to receive the water from the turbines, the latter being drained into the ocean at low tide. It will be seen that if the storage bay is of such capacity that the descent of the surface of the water therein by discharge through the turbines is slower than the fall of the tide outside, and if the drainage bay is of such capacity that the rise of the water surface therein is slower than the rise of the tide outside, there will always be a difference (though a continually varying difference) in the height of water in the two bays, which means that there can always be a head on the turbines. In general this head will have its minimum at neap tide and its maximum at spring tide.

My present invention is directed to the problem of utilizing tidal energy, and it employs a storage bay and a drainage bay, but they are employed in novel manner, by which with any given turbine-capacity, bay-capacity and tide-amplitude I am able to obtain a substantial increase in actual head on the turbines. Carried out in the preferred manner my method not only gives higher water in the storage bay but also lower water in the drainage bay, at all stages of the tide, than in prior systems; so that it is equivalent, in effect, to increasing the amplitude of the tide.

In carrying out my invention in the preferred manner I use an intermediate bay or its equivalent between the storage bay and the turbines. The function of the intermediate or, more conveniently, the receiving bay, is to receive water from the storage bay or directly from the ocean, at will, and deliver or pass it on to the turbines. Between the turbines and the drainage bay I use still another bay or its equivalent, conveniently termed a tailbay, the function of which is to receive water from the turbines and deliver or pass it on to the drainage bay, or directly to the ocean, at will. The flow of water is controlled by suitable gates or valves, which may be of any convenient type, and may be operated by power. The intermediate bays may be relatively small, and preferably are since in most cases they will be largely artificial and hence the construction cost would be much greater if their capacity had to be large.

Referring now to the accompanying drawings, which are diagrammatic in character, Fig. 1 is a plan view of a system employing two bays, one a storage bay to receive water from the rising tide and deliver it to the turbines, the other to receive water from the turbines and deliver it to the falling tide.

Fig. 2 is a cross section on line 2—2 of Fig. 1.

Fig. 3 is a plan view of a system employing four bays—a storage bay and a drainage bay, as in Fig. 1; and, in addition, a receiving bay to receive water from the storage bay or from the ocean, at will, and to deliver it to the turbines, and a tailrace bay to receive water from the turbines and deliver it to the drainage bay or to the ocean, at will.

Fig. 4 is a cross section on line 4—4 of Fig. 3.

Figs. 6 and 7 are plan views illustrating other forms of the invention.

Figure 5:
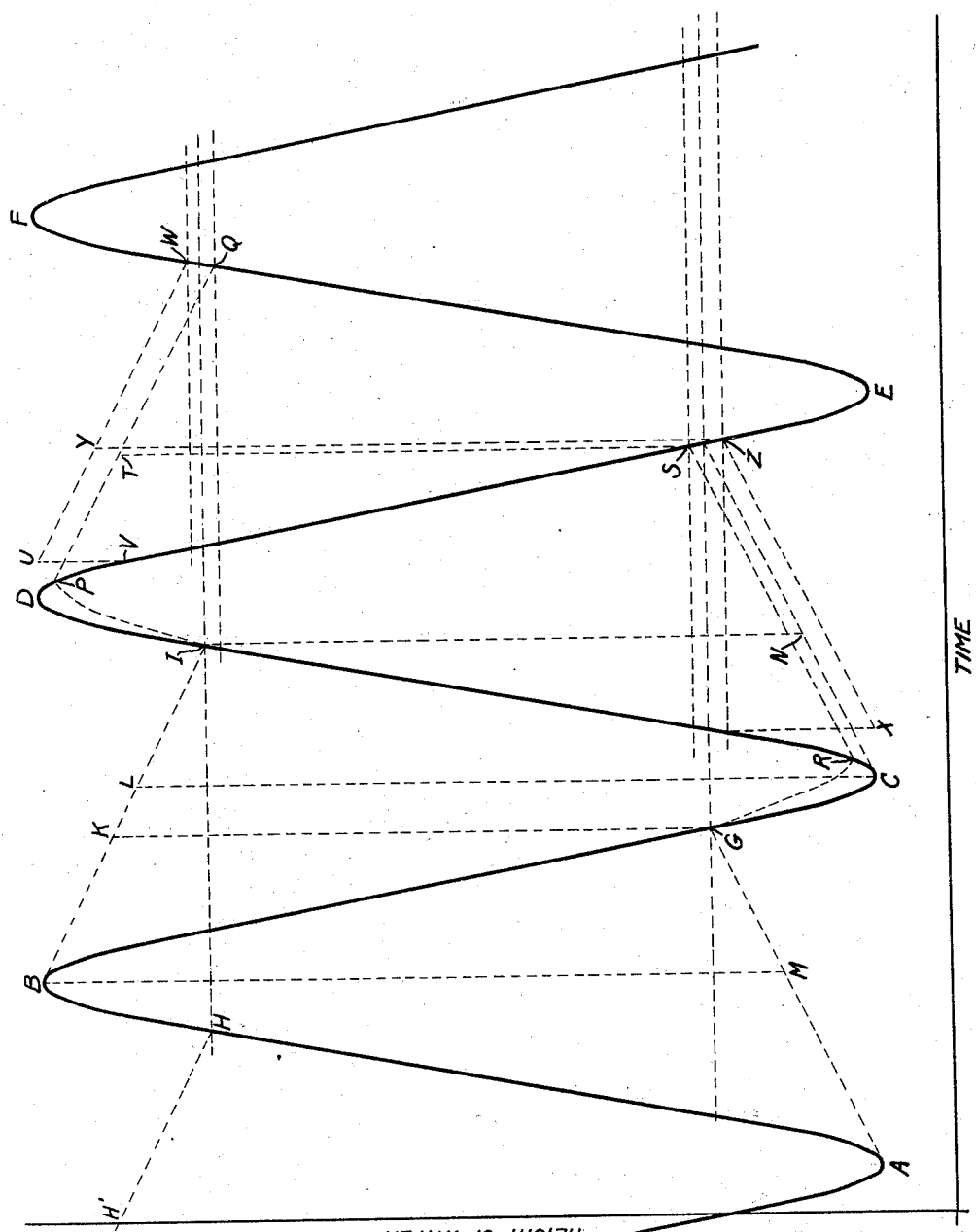
Fig. 5 is a diagram illustrating graphically the operation of the two systems.

In Figs. 1 and 2, bay 10, for impounding water at high tide, has communication with the ocean (indicated by the horizontal broken lines) under the control of a suitable gate 11. Bay 12, into which the water from the turbines is delivered, has communication with the ocean under the control of a gate 13. Between the two bays is a powerhouse 14, having electric generators 15, driven by turbines 16 directly underneath.

In Figs. 3 and 4 the storage and drainage bays are indicated at 18, 19, respectively. Between the two are the receiving bay 20 and tailrace bay 21, and between the latter bays is the powerhouse 22, containing generators 23 driven by turbines 24. Communication between the bays, and between the bays and the ocean, is controlled by gates 25, 26, 27, 28, 29, 30. One gate is shown at each of these points but as many may be provided as convenience or necessity, or both, may demand. Also, the number of turbines may be one or more.

The wave curve A, B, C, . . . F, Fig. 5, represents generally the cycle of the tide, time being plotted on the horizontal axis and height of water on the vertical. In this figure I take no account of the change in tidal range or amplitude, decreasing from spring tide to neap and increasing from neap to spring, or of the priming and lagging of the tides, or other departures from regularity in time and amplitude, since these factors do not in general affect the principles involved and their inclusion would merely add complication. It is assumed, however, that the curve represents the cycle at neap tide.

It is also assumed (in Figs. 1 to 4 inclusive) that the capacity of the turbines is such that the flow of water therethrough will lower the water in the storage bay at a slower rate than the fall of the tide outside and will raise the water in the drainage bay at a slower rate than the rising tide outside. Otherwise there would be no advantage in employing two bays, as will be understood upon reflection. It is further assumed that the water surface falls in the storage bay (by outflow through the turbines) at the same rate as the rise of water in the drainage bay by inflow from the turbines, though it is recognized that in practice this equality of rate will seldom if ever exist.

Referring now to Figs. 1, 2 and 5: at some time before low tide the gate 13 is opened, whereupon the water accumulated in the drainage bay 12 begins to drain out into the falling tide, and at the time A (low tide) gate 13 is closed. The water in bay 12 now begins to rise by reason of inflow from the turbines, while the tide outside rises to high at B, then falls again. At some time in its fall it reaches the same height as the rising water in bay 12, say at the time and height indicated by the point G. The line A—G then represents graphically in time and height the rise of water in bay 12, its minimum being at A and its maximum at G. If the depth of the bay is not uniform and its walls not vertical, and the rate of inflow from the turbines is not constant, the line will be curved; but these conditions are neglected here, as not affecting the principles involved, and the line is therefore shown straight.

At some time the surface of the tide rising from A overtakes the surface of the falling water in bay 10, say at the time and height represented by the point H. Gate 11 is then opened, permitting the tide to flow in and fill the bay, and at high tide B the gate is closed. Thereafter the water falls in the bay by reason of the outflow through the turbines, and its descending surface reaches the level of the next rising tide at I, which for convenience we assume to be at the same height as H. The line B—I then represents graphically in height and time the fall of the water in bay 10. If the depth of the bay is not uniform and its walls not vertical, and the turbine outflow is not constant in rate, the line will be curved, but it is shown straight for the same reasons as stated above in connection with line A—G. Line H'—H, which we assume has the same slope as line B—I, represents the fall following the preceeding high tide.

From the foregoing it will be seen that at some hour the water in the drainage bay 12 is at the maximum height, G. The possible head on the turbines at that hour and then be represented by the vertical line G—K, which indicates the difference between the height of water in bay 12 and the contemporaneous height in bay 10, that is, the difference between headwater and tailwater. Placing the turbines below the level of G would not increase G—K, since at the hour G they would be submerged and the effective head would still be G—K; but such lower postion would, evidently, make the head greater at some if not all other hours. For example, if placed at C (or at a height above C equal to the length of the draft tubes, assuming the turbines to be equipped with draft tubes, as is customary) the head at the hour C would be C—L, at the hour B the head would be M—B, and at the hour I it would be N—I, which may be equal to but in general will not be less than G—K. It therefore appears that with the relative rates of rise and fall indicated in the figure the turbines can be so located that the head need never be less than G—K.

The consumption of current by users in a given community is never uniform in amount throughout twenty-four hours of the day. For example, if the current is consumed chiefly for lighting, the "peak load" on the supply occurs at night, and the necessary extra equipment for taking care of the peak is idle at other times. From Fig. 5 it will be apparent that at each high tide the head on the turbines is much greater than at the later hour G, and in some circumstances this excess can be used for peak requirements, but peak loads occur (in the long run) at approximately the same hours of the day, whereas the time of high tide changes from day to day. It will therefore be seen that from a practical standpoint the minimum head G—K is, in general, the maximum.

The above discussion is based on the assumption that when gate 11, Fig. 1, is closed at high tide (as B) the water in the bay 10 is at the same height as the water outside, but as a matter of fact the tide rising in the bay lags behind the tide outside due to the head on the gates necessary to take care of the outflow through the turbines and to fill the bay. Consequently at any high tide (say D) the water inside bay 10 will not be at the height D but will be at some lower point, say P. Drawing a line rightwardly from P parallel to B—I, we find that it intersects the curve of rising tide not at the level of I but at a point Q, below that level. Similarly, the outflow from the bay 12, as the tide outside falls from G to C, lags behind the tide, with the result that when the gate 13 is closed at the hour C the water inside it at, say, R. Drawing a line rightwardly from R parallel to A—G, we find that it meets the curve of falling tide not at the level of G but at a higher level S. It will therefore be seen that the practical maximum head is not G—K but is S—T, which is materially less.

Using the two addiional bays 20, 21, Fig. 3, it is possible by proper operation of the gates 25, 26, . . . 30, to increase the head S—T very substantially, as will now be explained.

Referring to Figs. 3, 4 and 5: when the gate 25 is opened to admit water from the rising tide, gate 27 is also opened and gate 26 closed. The turbines are now supplied directly from the rising tide, and no water is taken from the storage bay 18. Consequently the water therein can rise as high as the tide outside, and in some cases higher because of the "piling up" of the water in the far reaches of the bay. At high tide (for example D) gate 25 is closed, but I do not open gate 26 and close gate 27. On the contrary gate 26 is left closed and 27 open until, say, the hour U, at which time the tide outside has fallen to the level V. Gate 26 is now opened and 27 closed. Thereafter the water surface in bay 18 descends, not as represented by line P—Q, but as represented by the higher line U—W, which, it will be observed, meets the rising tide (when gate 25 can be opened again) at a level considerably above Q. That is to say, the minimum height of water in the storage bay is raised from Q to at least W. If the next tide is higher than the preceding the leg of the curve ascending from E to F will be somewhat steeper and hence the line U—W would meet the curve at a higher point than W, with the result that the next filling (after the filling at D), and the next operation with water direct from the ocean, can begin at an earlier hour and with the water in the bay at a higher level. Conversely, if the next tide (after D, for example) is lower, the next filling would begin at later time, and at a lower level of water in the bay.

Similarly, when the falling tide outside of drainage bay 19 overtakes the rising water in the bay, gate 30 is opened, 28 is closed, and 29 opened. The turbine outflow now discharges, not into bay 19, but into the falling tide outside, through gate 29, and hence when gate 30 is closed the water in the bay is at the same low level as the tide. Gate 28 is kept closed, however, and gate 29 open, until a time X. At this hour 28 is opened and 29 closed. Thereafter the water in the bay 19 rises, not along line R—S but along the parallel line X—Z, which meets the next falling tide (when gate 30 can again be opened) at a level Z, materially below S. If the next low tide (after a given emptying of the drainage bay) is lower or higher than the preceding, the line X—Z will meet the curve at a point lower or higher than Z, and the next emptying may begin at an earlier or later time and with the water in the bay at a lower or higher level, as the case may be.

The net result is that the practical maximum head at neap tide is increased from S—T to Z—Y. Under favorable conditions the increase may be very substantial. For example, in my contemplated operations on the coast of Maine, where the tides in the Bay of Fundy will be utilized, I estimate that the increase of head thus obtained will be equivalent to more than 75,000 horsepower.

In carrying out my invention in practice the fullest advantage should be taken of the natural topography of the coast, utilizing natural bays or estuaries as much as possible in order to keep down the construction cost. By locating the powerhouse close to the ocean, as indicated in Fig. 3, the lag between the powerhouse and tide outside the gates 27 and 29 can be made practically nil. Fresh water streams emptying into the bays will, in general, increase the height of water therein, and this factor may in the case of two adjacent bays largely affect the choice of which shall be the storage and which the drainage bay; or if other factors dictate a contrary choice it may be feasible and desirable to divert into the ocean, or even into the bay selected for storage, streams discharging naturally into the bay selected for drainage. The receiving and tailbays 20, 21, Figs. 3 and 4, may be natural bays, or in part artificial, or they may be mere open conduits of adequate capacity, made by diking off parts of the main bays. In some cases it may be desirable to use tunnels, or even pipes, as indicated for example in Fig. 6. In this figure the pipes $20^a$, $21^a$ correspond to the bays 20, 21, of Fig. 3, and the valves $26^a$, $27^a$, $28^a$, $29^a$ to the gates 26, 27, 28, 29. Similarly, it is not, in principle, necessary that the location of the turbines be actually between the two main bays, the only requirement being that water flowing from the storage to the drainage bay shall pass through the turbines. Thus in Fig. 7 the powerhouse is located at the side of the drainage bay remote from the storage bay and is connected with the latter and with the ocean by piping 20$^b$ provided with valves 26$^b$, 27$^b$. Piping 21$^b$, connecting the turbines with the drainage bay and with the ocean, is provided with valves 28$^b$, 29$^b$. It is evident that the valves can be operated in the same sequence as the corresponding gates in Fig. 3, with like results.

In the foregoing description and in the appended claims I have used the word "ocean" to mean the body of water outside of the bays, whether it actually be the ocean or a bay, sound, estuary, or other body connected with the ocean. One of the intermediate bays may be omitted, especially if one of the main bays is much greater in capacity than the other. For example, if the storage bay is very large and the drainage bay comparatively small, the maximum amount of power continuously obtainable will be determined largely by the capacity of the drainage bay, and by the time the gates are opened to empty the latter the fall of the water in the storage bay may be very slight, so that the cost of providing a receiving bay may not be worth while.

It is to be understood that the invention is not limited to the details herein specifically described but may be carried out in other ways without departure from its spirit.

I claim—

1. In a method of utilizing tidal energy, the steps comprising impounding water at high tide; passing water through turbines from the ocean during a time beginning before and ending after high tide, and during periods before and after such time delivering impounded water to the turbines and discharging such water into the drainage bay; and delivering water from the turbines into the ocean during a period beginning before and ending after low tide.

2. In a method of utilizing tidal energy, in which water is impounded in a bay at high tide, the improvement comprising operating with water direct from the ocean while the bay is filling and for a period after the bay is filled, and thereafter operating with impounded water, and in operating with impounded water discharging tail water into a drainage bay during a period beginning when the water in the impounding bay and the rising tide outside are at the same level and ending when the rising water in the drainage bay and the ebbing tide outside are at the same level.

3. In a method of utilizing tidal energy, in which water is impounded in a storage bay at high tide and delivered through turbines into a drainage bay which is emptied at low tide, the improvement which comprises operating with water direct from the ocean while the storage bay is filling and for a period after the bay is filled and thereafter operating with impounded water, discharging water from the turbines directly into the ocean while the drainage bay is emptying and for a period after it is emptied, and in operating with impounded water discharging the tail water into the drainage bay while the tide is falling to the level of the water in the drainage bay.

4. In a method of utilizing tidal energy, in which water is impounded in a storage bay at high tide, the improvement comprising operating with water direct from the ocean for a period after the bay is filled, and then operating with impounded water and delivering the tail water into a drainage bay until the rising water therein and the falling tide outside have reached the same level.

5. In a method of utilizing tidal energy, in which water impounded in a storage bay is discharged through turbines into a drainage bay, the improvement comprising admitting water to the storage bay during a period of rising tide and impounding it at high tide, for a period after impounding operating with water direct from the ocean, and thereafter operating with water from the storage bay, all while discharging the tail water into the drainage bay; emptying the drainage bay into the ocean during a period of falling tide and preventing inflow of water direct from the ocean at all times, discharging water from the turbines directly into the ocean for a period after the drainage bay is emptied, and thereafter discharging into the drainage bay the impounded water delivered to the turbines.

6. In a method of utilizing tidal energy, in which water is impounded in a storage bay and discharged through turbines into a drainage bay, the improvement comprising operating with water direct from the ocean during the period of lag in filling the storage bay to permit filling of said bay to substantially the level of high tide and continuing such operation until the tide has fallen to substantially the level at which the next filling will begin, then operating with water from the storage bay and while so operating discharging the tail water into the drainage bay until the rising water therein and the falling tide outside have reached the same level.

7. In a method of utilizing tidal energy in which water is discharged from the storage bay through turbines into a drainage bay, the improvement comprising passing water from the storage bay through the turbines and discharging it directly into the ocean during the period of lag in emptying the drainage bay to permit the water therein to fall to the level of low tide, countinuing such discharge until the tide has risen to substantially the level at which the next emptying will begin, and thereafter discharging the water into the drainage bay.

8. In a method of utilizing tidal energy in which water from a storage bay filled during a period of rising tide is discharged through turbines into a drainage bay emptied during a period of falling tide, and in which the filling lags behind the rising tide and the emptying lags behind the falling tide, the improvement comprising passing water from the storage bay through the turbines, putting the turbines in direct communication with the ocean during at least one of such periods of lag, and at all other times putting the turbines in communication with the drainage bay for discharge directly into the same.

9. In a method of utilizing tidal energy, filling a storage bay while the tide is rising, and during the filling period and for a time after the bay is filled to the level of high tide, the tide ebbing meanwhile, operating the turbines with water from the ocean and discharging such water from the turbines into a drainage bay; then operating the turbines with water from the storage bay, and discharging the water into the drainage bay until the rising water therein and the ebbing tide outside have reached the same level; and then emptying the drainage bay into the ocean, and during the emptying period and for a time after the bay is emptied to the level of the low tide, the tide rising meanwhile, discharging the water from the turbines into the ocean, and then again discharging it into the drainage bay.

10. In a method of utilizing tidal energy, filling a storage bay while the tide is rising, and during the filling period and for a time after the bay is filled to the level of high tide, the tide ebbing meanwhile, operating the turbines with water from the ocean and discharging such water from the turbines into a drainage bay; then operating the turbines with water from the storage bay, and discharging the water into the drainage bay until the rising water therein and the ebbing tide outside have reached the same level; and then emptying the drainage bay into the ocean, and during the emptying period and for a time after the bay is emptied to the level of low tide, the tide rising meanwhile, discharging the water from the turbines into the ocean, and then again discharging it into the drainage bay; continuing to operate the turbines with water from the storage bay (while discharging water into the drainage bay) until the falling water in the storage bay and the rising tide outside have reached the same level, and then refilling the storage bay and repeating the cycle described.

11. In a system for utilizing tidal energy, a storage bay and a drainage bay, a receiving bay and a tail bay, means for controlling communication between the storage bay and the receiving bay, between the tail bay and the drainage bay, and between each of said bays and the ocean; and turbines, located close to the level of low tide, to receive water from the receiving bay and discharge the same into the tail bay; said means being constructed to prevent at all times all passage of water from the storage bay to the drainage bay except through the turbines.

12. In a system for utilizing tidal energy, a storage bay having a gate operable at will to admit and impound water from the ocean, a drainage bay having a gate operable at will to discharge water into the ocean, a power house between said bays and close to the ocean, equipped with turbines and with electric generators driven thereby, a receiving bay between the storage bay and the power house and having gates operable at will to put the receiving bay in communication directly with the storage bay or directly with the ocean, a tail bay between the drainage bay and the power house and having gates operable at will to put the tail bay in communication directly with the drainage bay or directly with the ocean, said receiving bay and tail bay and their gates at all times preventing flow of water from the storage bay to the drainage bay except through the turbines.

In testimony whereof I hereto affix my signature.

DEXTER P. COOPER.